United States Patent Office 3,403,200
Patented Sept. 24, 1968

3,403,200
POLYAMIDE AND POLYSULFONAMIDE AZO DYES
John J. Randall, Cumberland Hill, R.I., assignor to Borg-Warner Corporation, Chicago, Ill., a corporation of Illinois
No Drawing. Filed Mar. 30, 1966, Ser. No. 538,592
8 Claims. (Cl. 260—857)

ABSTRACT OF THE DISCLOSURE

Polymeric dyes may be prepared from diamines containing diazo groups. The diamines are reacted with diacid chlorides or disulfonyl chlorides to form the corresponding polyamides and polysulfonamides. The diamines containing the diazo groups are prepared by reacting a tetrazotized diamine with a diazo coupling compound.

In an example 0.1 mole of oxydianiline was dissolved in 200 ml. of 50/50 HCl/H$_2$O solution and cooled to 0° C. An aqueous solution of 0.2 mol of NaNO$_2$ is added dropwise until all the amine reacts. 0.2 mole of N-(2-aminoethyl)-N-ethyl-m-toluidine is mixed with 40 ml. of the 50/50 HCl/H$_2$O solution and allowed to stand overnight.

The coupled amine is then reacted with 0.1 mole of a diacid chloride such as sebacyl chloride or 4,4'-biphenyl-disulfonyl chloride.

---

Prior to this invention, thermoplastic materials were normally colored by addition of pigments and toners. The pigments provided the desired depth of shape and the toner, i.e., soluble dye, provided the desired brightness.

One of the primary problems encountered in the addition of toner or soluble dyes was that they were subject to "bleeding," i.e., the dyes had a tendency to migrate to the surface of the material to which they were added. This migration caused the color and brightness level to decrease, causing the material to appear faded and lacking in brightness.

Also, the addition of pigments to thermoplastic materials was not entirely satisfactory due to the nature of the pigment particles. Inasmuch as pigments are particulate, they have very poor distribution tendencies and cause the plastic material to be hazy and uneven in color. The fact that the pigments are made up of particles also causes them to have a degrading effect on the thermoplastic to which they are added. The degrading effect is, of course, due to the incompatibility of the particulate matter with thermoplastic materials.

Briefly stated, this invention is directed to polymeric dyes for coloring thermoplastic materials, which dyes are prepared from diamines reacted with diacid chlorides. These dyes are not subject to bleeding and will provide the brightness and color normally obtained from a combination of toner and pigments even when they are used at very low concentrations in a thermoplastic material, such as the polyesters, polyamides, ABS plastic, polycarbonates, polystyrene, polymethyl methacrylate, as well as copolymers and blends thereof.

The polymeric dyes of this invention have the further advantage of not causing a degrading effect on the thermoplastic material to which they are added, nor are they subject to bleeding and/or fading over a period of time.

The polymeric dyes of this invention have characteristics of a thermoplastic polymer and are compatible with a great variety of thermoplastic materials. The polymeric dyes of this invention may be added to virtually any polymeric material such as ABS plastics, polyethylenes, polyethers, conjugated dienes, graft copolymers, blends thereof and the like. The polyamide dyes of this invention are prepared from diamines of the formula:

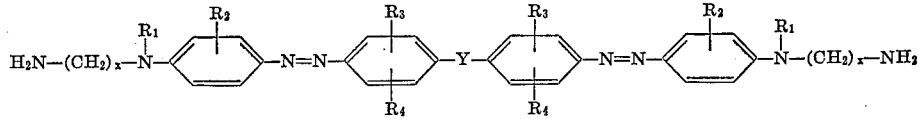

wherein $x$ is 1 to 5, $R_1$ and $R_2$ are aliphatic or substituted aliphatic radicals having one to four carbon atoms, $R_3$ is hydrogen, an aliphatic or substituted aliphatic containing one to four carbon atoms, halogen, nitro, methylsulfonyl and substituted methylsulfonyl organic radicals, and $R_4$ is hydrogen, halogen or a nitrosubstituent group. Y may represent a carbon-carbon bond, an oxygen, methylene, sulfur, sulfoxy, sulfoxide, or sulfone radical.

In accordance with this invention, diamines containing at least one chromophoric moiety are prepared by reacting a tetrazotized diamine with a suitable diazo coupling compound under carefully controlled conditions. The diamine monomer must be suitable for reaction with diacid chloride to prepare a polymeric dye in accordance with this invention. Diamines such as benzidine, dichlorobenzidine, diaminodiphenylsulfone, oxydianiline, methylenedianiline, methylene-3,3'-dichlorodianiline, o-toluidine, etc. may be reacted to provide a diamine that may be utilized in preparing the polymers of this invention. In preparing the polymeric dyes, diamines are reacted with diacid chlorides of the formulas:

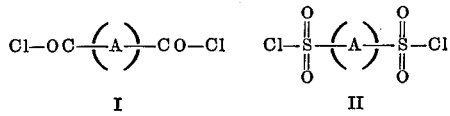

I      II to provide polymeric materials. A in Formula I may be aliphatic, cycloaliphatic or aromatic. Illustrative carboxylic aliphatic acid chlorides are sebacyl acid chloride, adipic acid chloride, suberic acid chloride, etc. Unsaturated aliphatic acid chlorides which may be used are fumaric chloride, mesaconic acid chloride, etc. Cycloaliphatic dicarboxylic acid chlorides such as cyclopentane dicarboxylic acid chloride and cyclohexane dicarboxylic acid chloride are also suitable. Illustrative aromatic dicarboxylic acid chlorides which may be used are terephthalic acid chloride, isophthalic acid chloride, and bibenzyl dicarboxylic acid chloride, etc.

A in Formula II may be represented by an aliphatic, cycloaliphatic or aromatic moiety, such as 4,4'-bibenzyl, 1,3-phenylene, 1,5-naphthylene, 2,7-naphthylene, etc. The chlorine in Formulae I and II may be replaced by another halogen such as bromine without affecting the product's properties since it is eliminated during the polymerization reaction.

The polymerization of the diamines with the diacid chlorides may be carried out either interfacially or by solution polymerization. The preferred method of polymerization is reacting the materials interfacially since, the diamine need not be isolated from the solution in which it is prepared. In interfacial polymerization, the acidic diamine solution is added to the diacid chlorides contained in an inert organic solvent. The polymerization may be carried out at or near room temperature by adding a sufficiently strong base to free the diamine and allow the dianiline was reacted with N-(2-aminoethyl)-N-ethyl-m-toluidine and added to 0.1 mole sebacyl chloride. The polymer obtained was a bright yellow powder with an intrinsic viscosity (measured by placing .25 g. of polymer in 100 ml. dimethylformamide at 25.0° C.) of 0.11. The polymer had a softening point of 126° C. and an extinction coefficient of 34,500 per unit molecular weight. The polymeric dye had the structural formula:

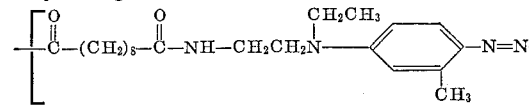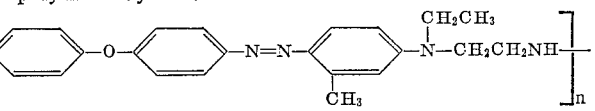

reaction to proceed. The reaction mixture is stirred vigorously during polymerization and the polymer is isolated by stripping the solvent, filtering and drying. Variations in the above procedure will be obvious to those skilled in the art of interfacial polycondensation.

The concentration of reactants in the aqueous organic phases may vary over a relatively wide range from less than one weight percent to more than 20 weight percent, being limited at the high concentrations only by the increasing difficulty encountered handling the viscous media.

Polymerization time may be varied, however, the normal interfacial polycondensation reaction is very rapid and is complete within about five minutes.

EXAMPLE 2

The procedure prescribed for the examples was repeated utilizing oxydianiline as the diamine, N-(2-aminoethyl)-N-ethyl-m-toluidine as the coupling component and sebacyl chloride as the diacid chloride. Hexamethylene diamine (.2 mole) was added to the reaction mixture along with an increased amount (0.3 mole) of sebacyl chloride to provide a polymer with an increased length between dye units. The polymer was an attractive orange powder and had an intrinsic viscosity (.25 g. polymer measured in 100 ml. formic acid at 25° C.) of 1.01 and a softening point of 155° C. The polymeric dye had the recurring structural formula:

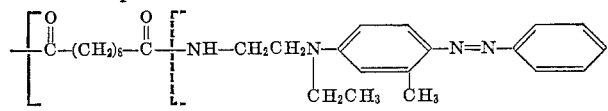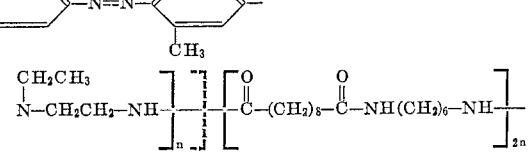

Although it is preferred to use approximately equimolar quantities of the diamines, with the diacid chlorides, the reactivity of the diacid chlorides and the reaction conditions are such that the use of exact stoichiometry is not critical to the attainment of relatively high molecular weights.

The following examples illustrate the preparation of the diamines which are utilized in the preparation of the polymeric dyes as well as the polymerization reaction of the diamines with the diacid chlorides. In the examples, when the polymers are used in thermoplastic compositions, they are used at .03 percent weight, however, they may be used in amounts from about .01 to about 3 or 4 percent by weight. The examples are meant to illustrate the invention and are not meant to restrict the scope of the invention.

In accordance with the examples, a suitable diamine (0.1 mole) is dissolved in 200 ml. of a 50/50 HCl/H$_2$O solution. The solution is poured into approximately 600 ml. of crushed ice and cooled to approximately 0° C. A water solution of .2 mole NaNO$_2$ is then added dropwise until all the amine reacts. .2 mole of a diazo coupling component is mixed with 40 ml. of a 50/50 HCl/H$_2$O solution and the mixture is allowed to react overnight.

The coupled amine solution is added to an ice water solution of 4 g. sodium lauryl sulfate in a ½ gallon high-speed blender and mixed at slow speed for one minute. A solution of .1 mole diacid chloride and approximately 400 ml. of methylene chloride that has been cooled to 0° C. is added. A water solution of 4 moles of a strong hydroxide, preferably sodium or potassium hydroxide that has been cooled to 0° C. along with approximately 600 ml. of crushed ice is also added. The reaction mixture is stirred for approximately 5 minutes and the product is isolated by neutralizing with HCl. The methylene chloride is stripped off and the product is filtered. The product is washed and dried and yields from about 95–100 percent of pure polymeric dye. The polymeric dye is air or oven-dried.

EXAMPLE 1

In accordance with the procedure described above, oxy-

EXAMPLE 3

The procedure described in Example 1 was repeated using oxydianiline as the diamine, N-(2-aminoethyl)-N-ethyl-m-toluidine as the coupling component, and terephthaloyl chloride as the diacid chloride. The resultant polymer was a yellow powder with an intrinsic viscosity (.25 g. polymer in 100 ml. dimethylfuran at 25° C.) of 0.15. The polymeric dye had the recurring structural formula:

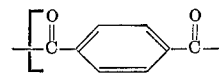

(Remainder of formula same as portion enclosed in brackets in broken outline in Example 2.)

EXAMPLE 4

The procedure described in Example 1 was repeated using oxydianiline as the diamine, N-(2-aminoethyl)-N-ethyl-m-toluidine as the coupling component and 4,4'-biphenyldisulfonyl chloride as the diacid chloride. The resultant polymer was a bright yellow powder and had an intrinsic viscosity (.25 g. per 100 ml. dimethylfuran at 25° C.) of 0.31. The polymer dye had the recurring structural formula of:

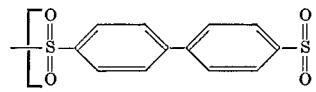

(Remainder of formula same as portion enclosed in brackets in broken outline in Example 2.)

EXAMPLE 5

The procedure described for Example 1 was repeated using 3,3'-dichlorobenzidine as the diamine, N-(2-aminoethyl)-N-ethyl-m-toluidine as the coupling component and sebacyl chloride as the diacid chloride. The resultant polymer was obtained in the form of dark red beads and has an intrinsic viscosity (.25 g. in 100 ml. formic acid at 25° C.) of 2.3 and a softening point of 154° C. The polymeric dye had the recurring structural formula of:

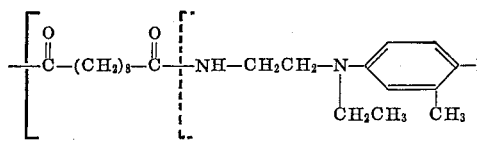

EXAMPLE 6

The procedure described above for Example 1 was repeated using 3,3'-dichlorobenzidine as the diamine, N-(2-aminoethyl)-N-ethyl-m-toluidine as the coupling component, and sebacyl chloride as the diacid chloride. N,N'-dimethylaniline (.003 mole) was added to the coupling component before its addition to the reaction to provide a lower molecular weight polymer. The resulting polymer was obtained in the form of a light red-brown powder with an intrinsic viscosity (.1 g. polymer 100 ml. formic acid at 25° C.) of 1.16. The polymeric dye had the recurring structural formula as shown in Example 5.

EXAMPLE 7

The procedure described for Example 1 was repeated using 3,3-dichlorobenzidine as the diamine, N-(2-aminoethyl)-N-ethyl-m-toluidine as the coupling component, and sebacyl chloride as the diacid chloride. N,N'-dimethylaniline (.005 mole) was added to the reaction prior to the coupling component and allowed to react. The resultant polymer was a reddish-brown powder with an intrinsic viscosity (.1 g. polymer in 100 ml. formic acid) of 1.35. The polymeric dye had the recurring structural formula as shown in Example 5.

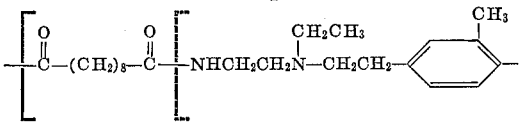

EXAMPLE 8

The procedure described for Example 1 was repeated using an increased amount of N,N'-dimethylaniline (.007 mole). The resulting polymer was a reddish-brown powder with an intrinsic viscosity (1. g. polymer per 100 ml. formic acid) of 1.46. The polymeric dye had the recurring structural formula as shown in Example 5.

EXAMPLE 9

The procedure described for Example 1 was repeated using 3,3'-dichlorobenzidine as the diamine, N-(2-aminoethyl)-N-ethyl-m-toluidine as the coupling component and sebacyl chloride as the diacid chloride. Aniline (0.01 mole) was added to the reaction in the large blender immediately before the addition of the diacid chloride to give a polymer with a lower molecular weight. The resultant polymer was an attractive glossy dark red porous material in bead form with an intrinsic viscosity (.1 g. polymer in 100 ml. formic acid at 25° C.) of 0.39. The polymeric dye had the recurring structural formula as shown in Example 5.

EXAMPLE 10

The procedure described for Example 1 was repeated using 3,3'-dichlorobenzidine as the diamine, N-(2-aminoethyl)-N-ethyl-m-toluidine as the coupling component, and terephthaloyl chloride as the diacid chloride. The polymer obtained was an attractive dark reddish-blue granular material with an intrinsic viscosity (.25 g. polymer in 100 ml. formic acid at 25° C.) of 0.23. The polymeric dye had the recurring structural formula:

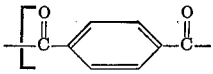

(Remainder of formula is same as portion enclosed in brackets in broken outline in Example 5.)

EXAMPLE 11

The procedure described for Example 1 was repeated using 3,3'-dichlorobenzidine as the diamine, N-(2-aminoethyl)-N-ethyl-m-toluidine as the coupling component, and 4,4'-biphenyldisulfonyl chloride as the diacid chloride. The resulting polymer was a granular dark red material with an intrinsic viscosity of (.25 g. polymer in 100 ml. formic acid at 25° C.) 2.5. The polymeric dye had the recurring structural formula:

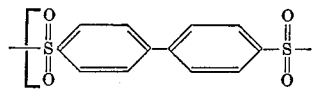

(Remainder of formula same as portion enclosed in brackets in broken outline in Example 5.)

EXAMPLE 12

The procedure described for Example 1 was repeated using diaminodiphenyl sulfone as the diamine, N-(2-aminoethyl)-N-ethyl-m-toluidine as the coupling component and sebacyl chloride as the diacid chloride. The polymer obtained is a brilliant orange powder with an intrinsic viscosity (.25 g. polymer in 100 ml. dimethylfuran at 25° C.) of 0.10, and a unit molecular weight extinction coefficient of 56,000. The polymeric dye had the recurring structural formula:

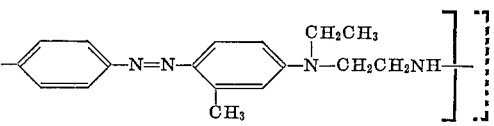

EXAMPLE 13

The procedure described for Example 1 was repeated using diaminodiphenyl sulfone as the diamine, N-(2-aminoethyl)-N-ethyl-m-toluidine as the coupling component, and terephthaloyl chloride as the diacid chloride. The polymer obtained was an attractive deep red powder with an intrinsic viscosity (.25 g. polymer in 100 ml. formic acid at 25° C.) of 0.4. The polymeric dye had the recurring structural formula:

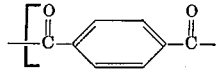

(Remainder of formula same as portion enclosed in brackets in broken outline in Example 12.)

EXAMPLE 14

The procedure described for Example 1 was repeated using diaminodiphenyl sulfone as the diamine, N-(2-aminoethyl)-N-ethyl-m-toluidine as the coupling component, and 4,4'-biphenyldisulfonyl chloride as the diacid chloride. The polymer obtained was in the form of glossy deep red granules with an intrinsic viscosity (.25 g. polymer in 100 ml. formic acid at 25° C.) of 1.7. The polymeric dye had the recurring structural formula:

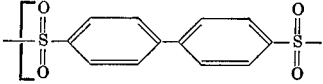

(Remainder of formula same as portion enclosed in brackets in broken outline in Example 12.)

EXAMPLE 15

The polymeric dye sample of Example 1 was intimately mixed with polymethyl methacrylate at a 0.03% by weight level. Attractive clear bright yellow articles were formed from this material, which articles had excellent fastness to bleeding and displayed adequate fastness properties in other respects. Polymeric dye concentration may vary from about 0.01 percent to about 3 or 4 percent by weight.

EXAMPLE 16

The polymeric dye of Example 1 was intimately mixed with an ABS polymer at a 0.03% by weight level. Attractive golden yellow articles were formed from this material, which articles had excellent fastness to bleeding and displayed adequate fastness properties in other respects.

EXAMPLE 17

The polymeric dye of Example 1 was intimately mixed with polyethylene at an 0.03% by weight level. Translucent honey-colored plastic articles were formed from this material, which articles had excellent fastness to bleeding and displayed adequate fastness properties in other respects.

EXAMPLE 18

The polymeric dye of Example 1 was intimately mixed with polystyrene-acrylonitrile at an 0.03% by weight level. Attractive clear yellow articles were formed from this material, which articles had excellent fastness to bleeding and showed adequate fastness properties in other respects.

EXAMPLE 19

The polymeric dye of Example 1 was intimately mixed with polystyrene (crystal) at an 0.03% by weight level. Clear bright yellow plastic articles were produced from this material, which articles had excellent fastness to bleeding and which displayed adequate fastness properties in other respects.

EXAMPLE 20

The polymeric dye of Example 1 was intimately mixed with a high impact polystyrene at an 0.03% by weight level. Attractive golden yellow plastic articles were formed, which articles had excellent fastness to bleeding and which showed adequate fastness properties in other respects.

EXAMPLE 21

The polymeric dye of Example 2 was intimately mixed with a graft ABS polymer at an 0.03% by weight level. Translucent beige articles were molded, which articles had excellent fastness to bleeding and which displayed adequate fastness properties in other respects.

EXAMPLE 22

The polymeric dye of Example 5 was intimately mixed with a polymethyl methacrylate at an 0.05% by weight level. Attractive bright red transparent plastic articles were formed from this material, which articles had excellent fastness to bleeding and which displayed adequate fastness properties in other respects.

EXAMPLE 23

The polymeric dye of Example 5 was intimately mixed with an ABS polymer at an 0.03% by weight level. Attractive light red plastic articles were formed from this material, which articles had excellent fastness to bleeding and which displayed adequate fastness properties in other respects.

EXAMPLE 24

The polymeric dye of Example 5 was intimately mixed with polyethylene at an 0.03% by weight level. Translucent pink plastic articles were formed from this material, which articles had excellent fastness to bleeding and which displayed adequate fastness properties in other respects.

EXAMPLE 25

The polymeric dye of Example 5 was intimately mixed with polystyrene-acrylonitrile at an 0.03% by weight level. Attractive clear bright red plastic articles were molded from this material, which articles had excellent fastness to bleeding and which displayed adequate fastness properties in other respects.

EXAMPLE 26

The polymeric dye of Example 5 was intimately mixed with polystyrene (high impact) at an 0.03% by weight level. Deep red plastic articles were formed from this material, which articles had excellent fastness to bleeding and which displayed adequate fastness properties in other respects.

EXAMPLE 27

The polymeric dye of Example 5 was intimately mixed with polystyrene (crystal) at an 0.03% by weight level. Excellent clear bright red plastic articles were formed from this material, which articles had excellent fastness to bleeding and which displayed adequate fastness properties in other respects.

EXAMPLE 28

The polymeric dye of Example 3 was intimately mixed with an ABS polymer at an 0.03% by weight level. Attractive light yellow plastic articles were formed from this material, which articles had excellent fastness to bleeding and which displayed adequate fastness properties in other respects.

EXAMPLE 29

The polymeric dye of Example 4 was intimately mixed with an ABS polymer at an 0.03% by weight level. Attractive light yellow plastic articles were formed from this material, which articles had excellent fastness to bleeding and which displayed adequate fastness properties in other respects.

EXAMPLE 30

The polymeric dye of Example 7 was intimately mixed with an ABS polymer at an 0.03% by weight level. Attractive light red plastic articles were formed from this material, which articles had excellent fastness to bleeding and which displayed adequate fastness properties in other respects.

EXAMPLE 31

The polymeric dye of Example 9 was intimately mixed with an ABS polymer at an 0.03% by weight level. Attractive light red plastic articles were molded from this material, which articles had excellent fastness to bleeding and which displayed adequate fastness properties in other respects.

EXAMPLE 32

The polymeric dye of Example 10 was intimately mixed with an ABS polymer at an 0.03% by weight level. Light red plastic articles were molded from this material, which articles had excellent fastness to bleeding and which displayed adequate fastness properties in other respects.

EXAMPLE 33

The polymeric dye of Example 11 was intimately mixed with an ABS polymer at an 0.03% by weight level. Light red articles were formed from this material, which articles had excellent fastness to bleeding and which displayed adequate fastness properties in other respects.

EXAMPLE 34

The polymeric dye of Example 12 was intimately mixed with an ABS polymer at an 0.03% by weight level. Attractive light orange articles were from the material, which articles had excellent fastness to bleeding and which displayed adequate fastness properties in other respects.

EXAMPLE 35

The polymeric dye of Example 12 was intimately mixed with a polymethyl methacrylate at an 0.03% by weight level. Attractive clear bright orange articles were molded from the material, which articles had excellent fastness to bleeding and which displayed adequate fastness properties in other respects.

EXAMPLE 36

The polymeric dye of Example 12 was intimately mixed with a polyethylene at an 0.03% by weight level. Translucent orange plastic articles were formed from this material, which articles had excellent fastness to bleeding and which displayed adequate fastness properties in other respects.

EXAMPLE 37

The polymeric dye from Example 12 was intimately mixed with polystyrene-acrylonitrile at an 0.03% by weight level. Attractive clear bright orange articles were formed from this material, which articles had excellent fastness to bleeding and which displayed adequate fastness properties in other respects.

EXAMPLE 38

The polymeric dye of Example 12 was intimately mixed with polystyrene (crystal) at an 0.03% by weight level. Attractive clear bright orange articles were formed from the material, which articles had excellent fastness to bleeding and which displayed adequate fastness properties in other respects.

EXAMPLE 39

The polymeric dye of Example 12 was intimately mixed with polystyrene (high impact) at an 0.03% by weight level. Bright orange articles were molded from this material, which articles had excellent fastness to bleeding and which displayed adequate fastness properties in other respects.

EXAMPLE 40

The polymeric dye of Example 13 was intimately mixed with an ABS polymer at an 0.03% by weight level. Bright red articles were formed from this material, which articles had excellent fastness to bleeding and which displayed adequate fastness properties in other respects.

EXAMPLE 41

The polymeric dye of Example 14 was intimately mixed

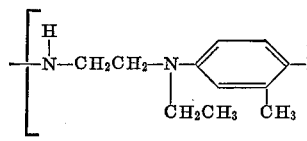

with an ABS polymer at an 0.03% by weight level. Light red articles were formed from this material, which articles had excellent fastness to bleeding and which displayed adequate fastness properties in other respects.

In the examples, the polymeric dye materials were blended with certain thermoplastic materials such as polyethylene, ABS polymers, polymethyl methacrylate, polystyrene, and mixtures thereof. It will be understood that other thermoplastic materials such as the polyesters, polyamides, polycarbonates, graft copolymers prepared from conjugated diene polymer and copolymer, backbones with acrylic acid nitrile and mononuclear aromatic hydrocarbon monomers attached thereto may also be useful in the practice of this invention. It is also obvious that the polymeric dyes of this invention may be added to virtually any other polymeric material as heretofore mentioned.

It should be understood that while this invention has been described in connection with certain specific dyes, and certain specific polymeric blends containing dyes, that this is by way of illustration and not by way of limitation and that the scope of this invention is defined solely by the appended claims which should be construed as broadly as is consistent with the prior art.

What is claimed is:

1. A polymeric dye selected from the group consisting of polyamides and polysulfonamides having an intrinsic viscosity of at least 0.1 when measured in dimethylformamide at 25° C., said polymeric dye having recurring structural units selected from the group consisting of carboxylate units of the formula:

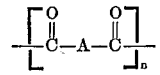

or sulfonate units of the formula:

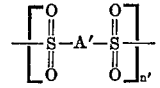

combined with diamine units of the formula:

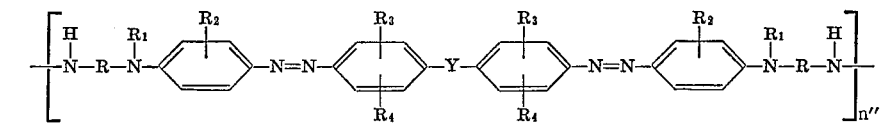

wherein A and A′ are selected from the group consisting of aliphatic, cycloaliphatic, and aromatic, R is an aliphatic group having from 1 to 5 carbon atoms, $R_1$ and $R_2$ are selected from the group consisting of aliphatic or substituted aliphatic radicals having 1 to 4 carbon atoms, $R_3$ is selected from the group consisting of aliphatic and substituted aliphatic radicals having from 1 to 4 carbon atoms, hydrogen, halogen, nitro, methyl sulfonyl and substituted methyl sulfonyl radicals, $R_4$ is selected from the group consisting of hydrogen, halogen or a nitro group, Y is selected from the group consisting of carbon to carbon bonds, oxygen, methylene, sulfur, sulfoxy, sulfoxide and sulfone radicals, and $n$, $n'$ and $n''$ are at least one.

2. The polymeric dye of claim 1 wherein the recurring carboxylate structural units are of the formula:

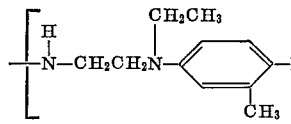

and the recurring diamine units are of the formula:

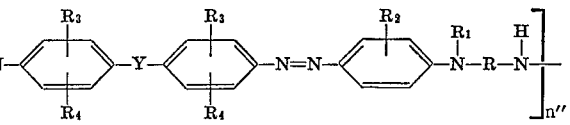

3. The polymeric dye of claim 1 wherein the recurring carboxylate units are of the formula:

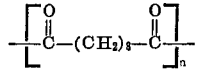

4. The polymeric dye of claim 1 wherein the recurring sulfonate structural units are of the formula:

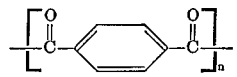

5. The polymeric dye of claim 1 wherein the recurring diamine structural units are of the formula:

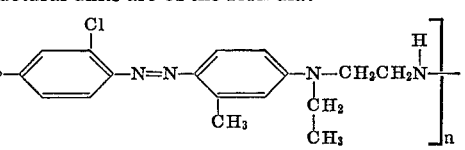

6. The polymeric dye of claim 1 wherein the recurring diamine structural units are of the formula:

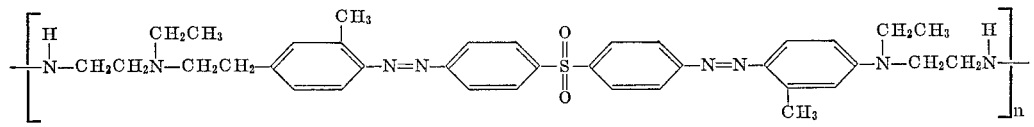

7. A thermoplastic blend containing a thermoplastic material having at least .03 percent by weight of the polymeric dye of claim 1 intimately mixed therein.

8. The thermoplastic blend of claim 7 wherein the thermoplastic material is selected from the group consisting of polyesters, polyamides, graft copolymers prepared from conjugated diene polymer and copolymer backbones with acrylic acid nitrile and mononuclear aromatic hydrocarbon monomers grafted thereon, polymethyl methacrylate, polystyrene and styrene copolymers and blends thereof.

References Cited

UNITED STATES PATENTS

| | | | |
|---|---|---|---|
| 2,994,693 | 8/1961 | Blake | 260—144 |
| 3,278,486 | 8/1966 | Meek | 260—78 |
| 3,344,098 | 9/1967 | Horigachi | 8—4 |

MURRAY TILLMAN, *Primary Examiner.*

P. LIEBERMAN, *Assistant Examiner.*